April 11, 1961
D. H. PUTNEY
2,979,308
APPARATUS FOR CONTROLLING TEMPERATURE CHANGE OF BLENDS
OF FLUIDS OR FLUIDS AND FINELY DIVIDED SOLIDS
Filed July 2, 1957
3 Sheets-Sheet 1
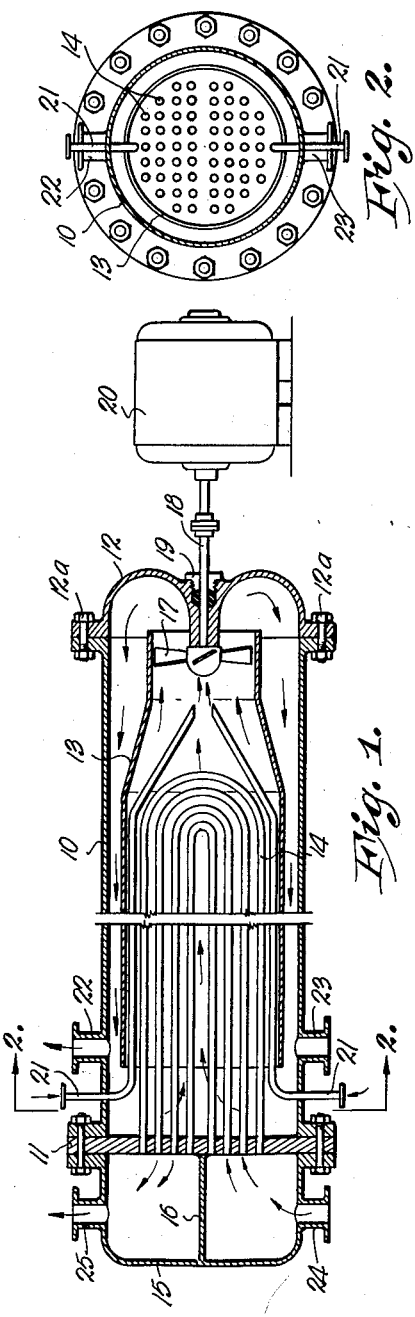
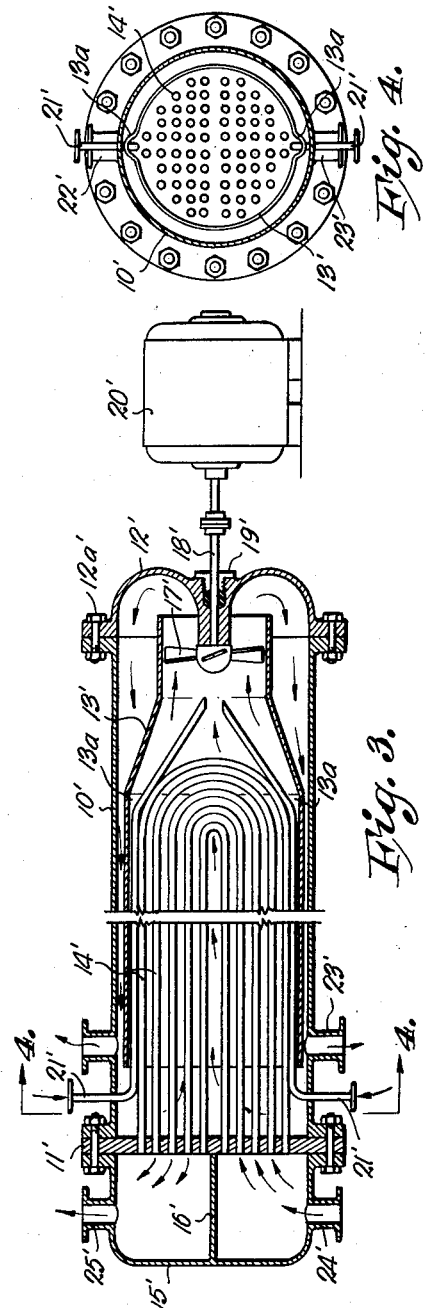
INVENTOR.
David H. Putney
BY
Thos. E. Scofield
ATTORNEY.

April 11, 1961  D. H. PUTNEY  2,979,308
APPARATUS FOR CONTROLLING TEMPERATURE CHANGE OF BLENDS
OF FLUIDS OR FLUIDS AND FINELY DIVIDED SOLIDS
Filed July 2, 1957  3 Sheets-Sheet 2
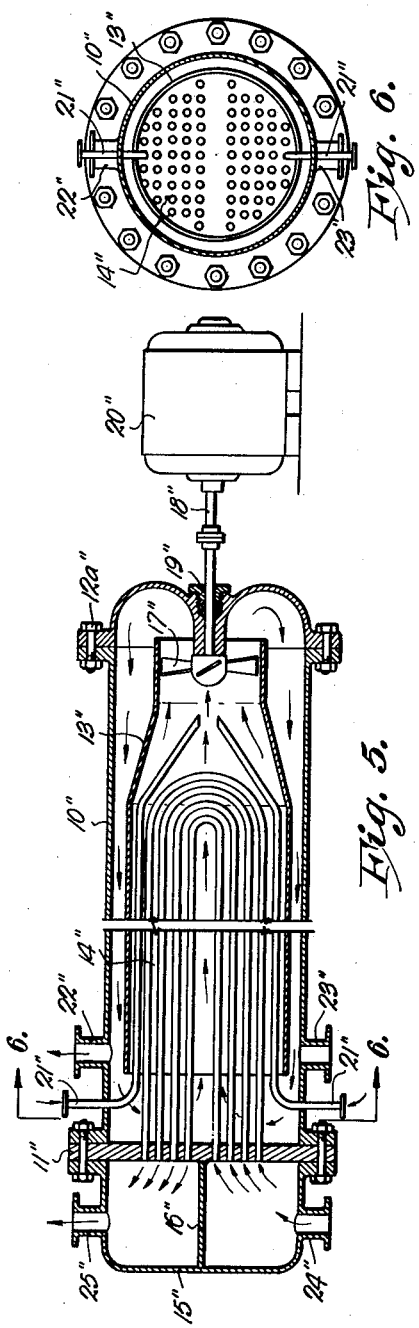
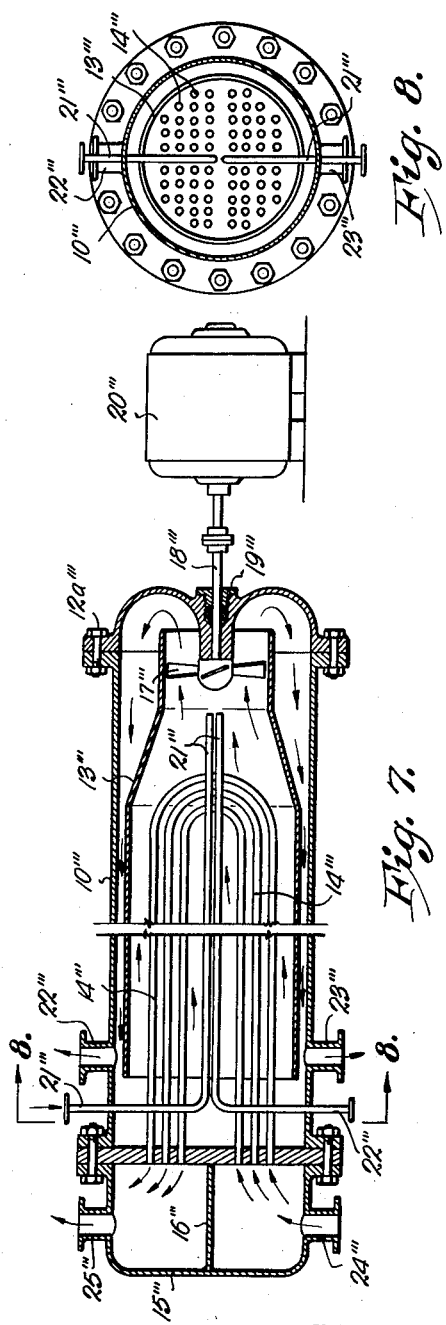
INVENTOR.
David H. Putney
BY
ATTORNEY.

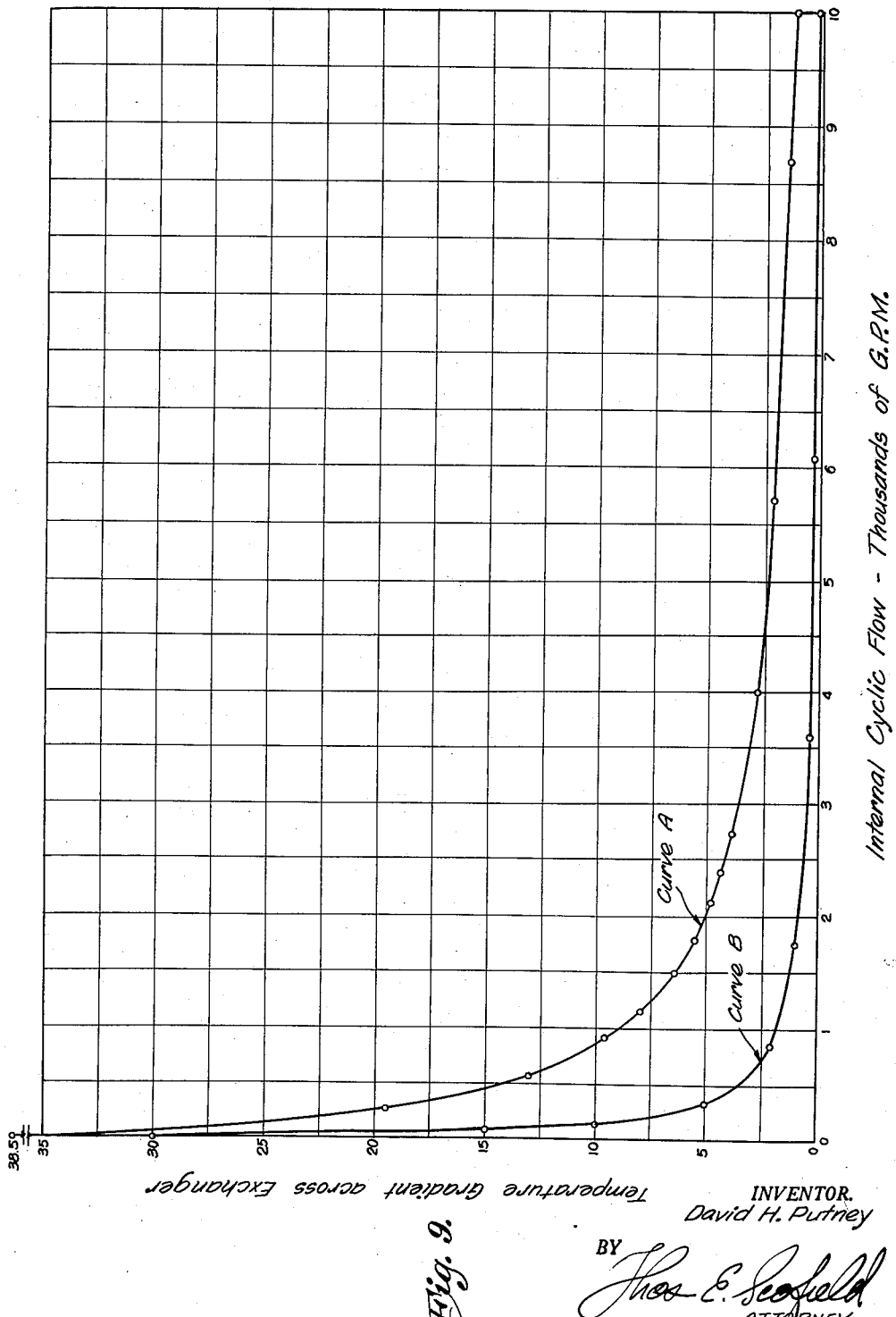

United States Patent Office 2,979,308
Patented Apr. 11, 1961

2,979,308

APPARATUS FOR CONTROLLING TEMPERATURE CHANGE OF BLENDS OF FLUIDS OR FLUIDS AND FINELY DIVIDED SOLIDS

David H. Putney, Kansas City, Kans., assignor to Stratford Engineering Corporation, Kansas City, Mo., a corporation of Delaware Filed July 2, 1957, Ser. No. 669,530

3 Claims. (Cl. 257—73)

This invention relates to improvements in apparatus for reducing the temperature change where fluids are blended or where finely divided solids are blended with fluids, and refers more particularly to such apparatus wherein is established a cyclic flowing stream of the blended fluid or fluids and solids, and wherein the introduction of the components is in such manner and at such feed rate that does not seriously disturb or affect the temperature of the flowing stream previously established.

The invention is a continuation-in-part of my application Serial No. 434,638, filed June 4, 1954, now Patent No. 2,800,307 granted July 23, 1957, and entitled "Apparatus for Controlling Temperature Change of Blends of Fluids or Fluids and Finely Divided Solids."

Many manufacturing procedures, chemical processes and blending problems involve the addition of a gas, liquid or a pulverized solid to a liquid or slurry while maintaining the total blend at a constant or nearly constant temperature. Frequently, these gas, liquid or solid additions are at temperatures above or below the temperature at which the blend should be maintained. Moreover, the addition materials or components being added are sometimes chemically reactive with the blend or with each other so that endothermic or exothermic heat of reaction must be added or removed if correct temperatures are to be maintained.

The conventional way of handling such materials has heretofore been to bring them together into a common line, either with or without some mixing device installed therein, and then to immediately pass the resulting blend to a heat exchanger where heat is either added or removed as required to give the desired temperature of the blend at the heat exchanger outlet. By this method, it is, of course, possible to accurately control the temperature of the blend at the point of exit from the exchanger or at any other single point in its passage through the exchanger, but not at all points in the exchanger. Following the addition of one or more of the fluids or pulverized solids to another, there may be a sudden temperature change occasioned by the actual temperatures of the components or by a chemical heat of reaction. This temperature change occurs either before the blend contacts the heat exchange elements or during the passage of the blend over the elements. There is, therefore, a temperature gradient established in the blend as it passes through the heat exchanger and its temperature is, therefore, not constant. In some processes, the product is quite sensitive to the temperature at which it is formed from its component parts, and the characteristics of the product are influenced by the temperature maintained in the blend from the instant the various components are brought together.

In the practice of processes which have been broadly described it is important to have apparatus which is not only simple of construction and economical, but also apparatus which is readily accessible or disassemblable for maintenance, inspection, repair and/or replacement of the various parts. In many chemical reactions, the various parts of the apparatus may be subject to corrosion or wear under the high circulating velocities, and the like, involved in the processes. Another important feature of any apparatus which involves high speed circulation of liquids, or slurries, is to have entire control of the flow within the vessel without the flow plan thereof being disrupted or bypassed at critical points or fitting points in the apparatus itself. Finally, in such processes as I have generally described, where gases, liquids or pulverized solids are added to circulating liquids or slurries while maintaining the total blend at a constant temperature, the additions frequently are at temperatures markedly above or below the temperature at which the blend should be maintained. In such instance, it is extremely desirable to reduce these temperature differentials before the reactants are passed into the circulating liquid or slurry whereby to get the optimum conditions.

Therefore, an object of this invention is to provide apparatus for maintaining a substantially constant temperature in a fluid or mixture of fluids passing through the apparatus even though large quantities of heat are removed from or added to said fluid mixture.

Another object of the invention is to provide apparatus which eliminates to a great extent the temperature gradient from a system wherein chemically reactive fluids or fluids and solids are brought together and such temperature gradient is normally present.

A further object of the invention is to provide apparatus for dissipating the sensible or exothermic reaction heat of fluids being blended in a large cyclic flowing stream of the blend while maintaining the cyclic flow of said stream and simultaneously removing an equivalent amount of heat from the blend by indirect heat exchange.

Another object of the invention is to provide apparatus for adding sensible heat or endothermic reaction heat to a blend of fluids by establishing a large cyclic flow in such blend, adding a required amount of heat to said cyclic stream and then adding the fluid components of the blend to the cyclic stream.

Yet another object of the invention is to provide apparatus for controlling the temperature change of blends of fluids or fluids and finely divided solids wherein the fluids are circulated within a casing through and around a circulating tube, an impeller at one end of said tube urging said fluid motion and heat exchange elements in the other end of the tube regulating the said temperature change, the circulating tube being removable easily and conveniently from the casing for maintenance, inspection, repair and/or replacement of the circulating tube, the heat exchanging elements, the casing or other parts of the apparatus.

Another object of the invention is to provide apparatus for controlling the temperature change of blends of fluids wherein a large cyclic flow of fluid is created in a vessel through and around a circulating tube by an impeller and wherein heat exchanging elements are positioned within a portion of the circulating tube, the apparatus so constructed as to completely obviate any possibility of bypass of the heat exchanging tubes by the circulating fluid or short circulating of the flow of circulating fluid short of its entire passage through and around the circulating tube whereby a maximum efficiency of heat exchange and a minimum loss of velocity across the heat exchanging tube bundle is achieved.

Yet another object of the invention is to provide an apparatus for controlling the temperature change of blends of fluids or fluids and finely divided solids wherein the temperature differential of reactant inputs to the apparatus which is conducting a high velocity cyclic flow of the blend is minimized before the reactants are added to the blend within the apparatus.

Other and further objects of the invention will appear in the course of the following description thereof.

In the drawings, which form a part of the instant specification and are to be read in conjunction therewith, several types of apparatus are shown which embody the invention.

Fig. 1 is a side view partly in section showing a first embodiment of the invention.

Fig. 2 is a view taken along the lines 2—2 of Fig. 1 in the direction of the arrows.

Fig. 3 is a modified embodiment of the invention, partly in section.

Fig. 4 is a view taken along the lines 4—4 of Fig. 3 in the direction of the arrows.

Fig. 5 is a side partly sectional view of a third modification or embodiment of the invention.

Fig. 6 is a view taken along the lines 6—6 of Fig. 5 in the direction of the arrows.

Fig. 7 is a side partly sectional view of a fourth modification of the invention.

Fig. 8 is a view taken along the lines 8—8 of Fig. 7 in the direction of the arrows.

Fig. 9 is a graph in which the temperature gradient across the heat exchanger is charted against the internal cyclic flow of the circulating stream in gallons per minute as applied to the examples hereinafter described.

Referring to Fig. 1, the tubular heat exchanger there shown comprises an outer shell 10 closed at one end with a tube sheet 11 and at the other end by a hydraulic pumping head 12. Within the outer shell 10 is a circulating tube 13 open at both ends for free communication with the space within the outer shell. Heating or cooling elements 14 in the form of U-bends made of tubing are rolled into or otherwise attached to the tube sheet 11. These elements extend through the open end of the circulating tube 13 and occupy an appreciable portion of the space enclosed by the circulating tube. A typical heat exchange channel or cover 15 equipped with a central partition or baffle 16 is provided within the channel for distribution of heating or cooling medium to the transfer elements 14. A pumping impeller 17 is located in the open end of the circulating tube 13 at the end opposite the tube sheet. This impeller is mounted on a shaft 18 rotating in a bearing in the pumping head 12 and sealed by a packed gland 19. The impeller is driven by any suitable prime mover such as a driving motor, turbine or engine, shown diagrammatically at 20.

Inlet nozzles 21 are provided for feeding components of the blend or mixture to the apparatus. These nozzles extend through the outer shell adjacent the end of the circulating tube 13 near the tube sheet 11, turn and pass adjacent the circulating tube to a point intermediate the tube bundle free end and impeller, preferably angling inwardly to discharge adjacent the impeller hub. In this modification, the tube bundle itself is constructed of an outer diameter less than the inner diameter of the circulating tube by an amount equal to the outer diameter of the feed lines 21. An objection to this modification lies in the possibility for by-pass of circulating liquid around the tube bundle without contact with the circulating tubes.

The impeller 17 is arranged for taking suction from the circulating tube 13 and discharging into the hydraulic head 12, where the flow of fluids is reversed and directed into the angular space between the outer shell and circulating tube. Nozzle 22 is provided in the outer shell for withdrawing the finished blend of components. A separate nozzle 23 on the underside of the outer shell serves as a drain for emptying the machine. Channel 15 is provided with an inlet connection 24 and an outlet connection 25 for the heating or cooling medium, whichever is being used.

To remove the circulating tube 13 from the casing 10, the circulating head is unbolted at 12a and the motor-circulating head assembly, with the impeller 17 is backed off. The circulating tube 13 itself is suspended in the casing by straightening vanes (not shown) which are bolted both to the circulating tube and the casing 10. These vanes may be arranged in any desired configuration whereby to control the flow as desired and yet not obstruct it, as well as support the circulating tube in the casing. Upon unbolting these connections to the casing, the circulating tube may be pulled from the casing out the open end. No change is necessary in either the tube bundle or the input feed lines 21. There is no problem of refitting of the input feed lines through openings in the circulating tube or removing or inserting them as they do not penetrate it. Thus there is no problem of leakage around such fittings. The extension of the input feed lines 21 into the casing and running a good portion of the length of the circulating tube, as well as extending downwardly in front of the tube bundle free end before the impeller, gives a major opportunity for heat exchanging should the feed inputs in the lines 21 be at a different temperature from the circulating slurry. If, say, there is a 12,000 gallon per minute circulating rate and the input feed is 200 gallons per minute, it will be seen that quite a respectable heat exchanging differential is achieved by this high velocity mass of different temperature circulating fluid.

The essential difference between the second modification of Figs. 3 and 4 and that of the foregoing described modification lies in that the tube bundle is of substantially the same outside diameter as the inside diameter of the circulating tube except for a small clearance required for assembly. Grooves 13a have been provided in the circulating tube where the input feed lines pass to give them room while still retaining them within the circulating tube itself. Since all of the other parts of the construction are identical to that shown in Figs. 1 and 2, the numbers will be exactly the same except primed. The operation, accessibility and advantages of this modification are exactly the same as those previously described relative Fig 1, with the impeller 17 driving the circulating fluid into the head 12' where the flow reverses and goes out into the annulus between the circulating tube 13' and the casing 10' and thence around the end of the circulating tube and back centrally thereof, the fluid feeds from the lines 21' then being passed into the circulating mass to be immediately highly disbursed by the impeller 17'. The modification shown in Figs. 3 and 4 does not have any problem of the by-passing of the circulating tube bundle found in the first modification of Figs. 1 and 2.

Referring now to the third modification of the invention shown in Figs. 5 and 6, therein all of the parts, operations and advantages are again identical with the original Figs. 1 and 2 except the arrangement of the input tubes relative the tube bundle. Here the tube bundle is, like the Figs. 3 and 4 modification, of an outside diameter substantially the same as the inside diameter of the circulating tube except for necessary clearance. However, peripheral tubes have been removed from the tube bank to permit the feed input lines to extend forwardly therewithin. All of the operations and characteristics of this modification are substantially the same as the previous modification except that the heat exchanging of the feed input tubes 21" is better than that in the previous modification as it is not as isolated from the general flow of the slurry through the circulating tube. The numbers in Figs. 5 and 6 are double primed on the like parts.

Like the third modification in Figs. 5 and 6, the operations, advantages and general over-all construction of the fourth modification shown in Figs. 7 and 8 are the same as in the first two modifications. Therefore, the like parts are like numbered except they are triple primed. In the fourth modification, the difference lies in that the feed input lines extend in through the casing adjacent the end of the circulating tube 13''', centrally of the tube bundle and then extend therethrough to a point intermediate the free end of the tube bundle and the impeller 17'''. Again, certain tubes must be removed to permit this passage through the tube bundle. This modification permits the outside diameter of the tube bundle to closely approximate the inside diameter of the circulating tubes so there is a minimum of by-passing of the heat exchanging elements. The operation and advantages of this modification are the same as those previously with the exception noted.

It will be understood that suitable connections are made to nozzles 24, etc., and 25, etc., and valves are provided to control the circulation of the heat exchange medium to the apparatus in desired quantities and at a proper circulating rate. Also, the temperature of the medium is governed according to the requirements of the particular fluid which is being tempered. Pipe connections are made to nozzles 21, etc., and in turn are connected to suitable sources of supply for introducing the components undergoing treatment in the apparatus. A discharge pipe is in each case connected to nozzles 22, etc., equipped with suitable valves and a discharge pipe to nozzles 23, etc., also equipped with valves to drain off the fluids when desired.

It is also contemplated that the direction of flow of the liquids may be reversed either by changing the pitch of the impeller or its direction of rotation. In other words, the invention contemplates any arrangement of heat exchange surface in a double shell vessel together with pumping means for establishing a closed cycle internal flow over that surface greater than the flow of fluids into or out of the exchanger.

As an example of the utility of the invention, consider first the problem of bringing together into heat exchange apparatus continuous streams of isobutane, butane and hydrofluoric acid and maintaining the resulting blend at a relatively constant temperature. When these constituents are brought together, a reaction takes place which converts the butenes and some of the isobutane to alkylate (isooctane). The reaction involves the release of a considerable quantity of heat which in many cases is removed in a heat exchanger not equipped with mechanical means for establishing cyclic flow therein. At the point where the constituents blend and before they pass over the exchange surface, the exothermic heat released raises the temperature of the mixture and this rise in temperature results in pressing the reaction in the direction of polymerization of butenes at the expense of isooctane production, which is undesirable. If, while this reaction is taking place, the content of the heat exchanger is rapidly circulated over the exchanger surface in a closed cyclic flow, and the feed components are added to this cyclic stream in accordance with the method therein contemplated, the temperature rise resulting from the heat of reaction can be reduced to any practical figure desired, depending upon the amount of cyclic flow established.

As an example of the deisrable effects which may be obtained, consider the case where 20 g.p.m. of butylene, 130 g.p.m. of isobutane, and 150 g.p.m. hydrofluoric acid (88% strength) all at a temperature of 60° F. are fed into a heat exchanger, and the temperature of the mixture controlled to maintain the resultant blend at a relatively constant temperature of 60° F. Under the conditions specified the exothermic heat of reaction amounts to 62,500 B.t.u. per minute, and this heat is so rapidly released at the point where the feed streams meet at the entrance to the exchanger that if the exchanger is of conventional type not equipped with internal cyclic flow, the temperature of the mix almost immediately rises to 98.5° F. This increased temperature tends to reduce the yield of isooctane produced and instead produces a complex of undesirable polymers.

Under conditions comparable to those just named, consider now the mixture of the same streams of components introduced into a heat exchanger of the type herein disclosed. The feed streams enter the apparatus and combine with a flowing cyclic stream which is many times their individual and combined flowing rate. For example, if the cyclic stream established by the pumping impeller in any of the apparatuses shown in 600 g.p.m., the maximum temperature which can occur is 72.8° F. If the cyclic stream is 1500 g.p.m. then the maximum temperature can be only 66.4° F. If the cyclic stream is 12,000 g.p.m. the maximum temperature will be under 61° F., less than 1° F. rise. The effect of cyclic flow rate on the temperature gradient is graphically shown by curve A of Fig. 9.

In all cases above prescribed, the heat exchange elements are removing the same quantity of heat, that is, 62,500 B.t.u. per minute. The larger the flow rate of the cyclic stream, the lower is the temperature range through which it must be cooled to remove the same amount of heat.

As a further example of the utility and novelty of the instant method, consider the case where 60 g.p.m. of hydrocarbon distillate are being passed through a heat exchanger, together with 1 g.p.m. of 98% sulphuric acid and it is advantageous to remove the heat of reaction resulting from the treatment of oil by the acid. If the streams of acid and oil are brought together and passed through a conventional heat exchanger or are brought together within the heat exchanger without recirculation, there results an immediate temperature rise of 30° F. and a temperature gradient across the exchanger. The heat absorbed in the exchanger amounts to approximately 6,900 B.t.u. per minute if the mixture is to be restored to its original feed temperature. If, however, the principle of the instant invention is utilized and circulation within the exchanger is established, then the same amount of heat can be removed while limiting the initial temperature rise in accordance with internal cyclic flow rates as follows:

| Feed Acid, g.p.m. | HC Feed, g.p.m. | Internal Cyclic Flow, g.p.m. | Maximum Temp. Rise, °F. |
|---|---|---|---|
| 1 | 60 | 0 | 30 |
| 1 | 60 | 61 | 15 |
| 1 | 60 | 122 | 10 |
| 1 | 60 | 305 | 5 |
| 1 | 60 | 854 | 2 |
| 1 | 60 | 1,769 | 1 |
| 1 | 60 | 3,599 | 0.5 |

From the table, the effect of cyclic flow rate upon temperature rise is simply explained as follows: When there is no cyclic flow established, then the 6,900 B.t.u. per minute is taken up by only the feed streams which total 61 g.p.m. and the resulting temperature rise is 30° F., if an internal cyclic flow of 61 g.p.m. is established and this cyclic flow is passed over exchange surface to cool it back to the 60° F. feed temperature, then when the feed streams are introduced into the cyclic stream the 6,900 B.t.u. per minute of exothermic reaction heat is dissipated into a total stream consisting of 61 g.p.m. feed and 61 g.p.m. of cyclic flow, so that the temperature rise is only half as much as if no cyclic flow were present. If the cyclic stream is established at a rate of 29 times the feed rate, then the temperature rise can be only one-thirtieth of the rise with no cyclic flow, or in this case only 1° F. Likewise in this example, the effect of cyclic flow rate upon temperature gradient is graphically shown by curve B in Fig. 9. Since in many processes it is highly desirable for various reasons to maintain temperatures as nearly constant as possible, the advantages of establishing a cyclic flow within a heat exchanger are numerous and manifest.

A formula developed from thermodynamical calculations based upon the invention and confirmed by practical tests reveal with arithmetical clarity the resultant effects obtained by varying the factors involved.

$$TG_c = \frac{TG_0 \times \text{feed rate}}{\text{Feed rate plus cyclic flow rate}}$$

where $TG_c$=The temperature gradient developed within the cyclic flow exchanger in degrees Fahrenheit.
$TG_0$=The temperature gradient developed with no cyclic flow in degrees Fahrenheit.
The feed rates and cyclic flow rates both being computed in gallons per minute.

From the foregoing it will be seen that the invention is well adapted to attain all of the ends and objects hereinbefore set forth, together with other advantages which are inherent to the method. High internal recirculation within the exchanger makes for high velocity over the exchange surface and high heat transfer rates. Moreover, the heat transfer rate can be maintained independently of the throughput rate since velocity over the tubes is a function of the internal circulation rather than feed rate. These benefits are inherent in the type of apparatus disclosed, but are secondary to the main purpose and objects of the method hereinbefore described.

It will be understood that certain features and sub-combinations are of utility and may be employed without reference to other features and subcombinations. This is contemplated by and is within the scope of the claims.

As many possible embodiments of the invention without departing from the scope thereof, it is to be understood that all matter herein set forth or shown in the accompanying drawings is to be interpreted as illustrative and not in a limiting sense.

Having thus described my invention, I claim:

1. In an apparatus for reducing the temperature change of a blend of fluids or fluids and finely divided solids including an elongate casing having a discharge outlet opening, a hollow open-ended circulating tube positioned axially within said casing and spaced from the interior wall thereof whereby to form an annular passage therewith, an impeller at one end of the circulating tube for creating a cyclic flow of fluids through said tube and in the annular space surrounding said tube, a removable circulating head forming the end of the casing adjacent to and including the impeller, a removable header at the other end of the casing, a plurality of relatively small diameter heat exchanging tubes connected into said header, all of said tubes extending axially of said casing into said circulating tube and substantially filling said portion of the tube enclosing them, whereby heat exchange between the fluids circulating in the cyclic stream through and about the circulating tube and heat exchanging medium passing through said heat exchange tubes is substantially isolated within the circulating tube, the improvement which comprises at least two fluid input lines penetrating the casing between the header and the end of the circulating tube next the header and extending into the end of the circulating tube away from the impeller, said fluid input lines extending within said circulating tube a distance greater than the heat exchange tubes therein whereby the discharge ends thereof are each positioned between the terminus of the heat exchange tubes adjacent the impeller and the impeller to discharge input fluids therebetween and obtain a maximum heat exchanging effect on the lines, said lines also so positioned relative to the heat exchanging tubes and impeller as to permit removal of the circulating head with the impeller and header with the heat exchanging tubes without removal of the imput lines.

2. Apparatus as in claim 1 wherein each input flowline, in its extension within the circulating tube in the portion thereof also receiving the heat exchange tubes is received in a closely fitting groove formed in the circulating tube peripheral to the heat exchanging tube bank.

3. Apparatus as in claim 1 wherein the input flowlines each extend through the tube bank, tubes being removed therefrom whereby to permit such extension.

References Cited in the file of this patent

UNITED STATES PATENTS

| | | |
|---|---|---|
| 1,988,766 | Aldridge | Jan. 22, 1935 |
| 2,085,069 | Bellinger | June 29, 1937 |
| 2,443,817 | Draeger et al. | June 22, 1948 |
| 2,474,592 | Palmer | June 28, 1949 |
| 2,677,000 | Russum | Apr. 27, 1954 |
| 2,762,682 | Wateren | Sept. 11, 1956 |
| 2,800,307 | Putney | July 23, 1957 |